United States Patent
Odle et al.

(10) Patent No.: US 8,075,245 B2
(45) Date of Patent: Dec. 13, 2011

(54) REMOVAL OF MOISTURE FROM PROCESS GAS

(75) Inventors: Robert R. Odle, Elkton, MD (US); David C. Seib, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 468 days.

(21) Appl. No.: 12/473,003

(22) Filed: May 27, 2009

(65) Prior Publication Data
US 2010/0303605 A1    Dec. 2, 2010

(51) Int. Cl.
*F01D 25/32* (2006.01)
*B01D 53/26* (2006.01)
(52) U.S. Cl. ............... 415/1; 415/169.2; 62/93; 62/283
(58) Field of Classification Search .............. 415/169.2; 95/288; 55/DIG. 17; 62/93, 283, 285
See application file for complete search history.

(56) References Cited

U.S. PATENT DOCUMENTS

| 3,892,499 A | 7/1975 | Strub |
| 5,259,868 A * | 11/1993 | Doubrawa et al. ................ 95/12 |
| 7,305,838 B2 * | 12/2007 | Fornof .............................. 62/93 |
| 2006/0218938 A1 | 10/2006 | Fornof |

FOREIGN PATENT DOCUMENTS
WO    2010/138403 A1    12/2010

OTHER PUBLICATIONS
PCT/US2010/035721 International Search Report and Written Opinion dated Jul. 20, 2010.

* cited by examiner

*Primary Examiner* — Edward Look
*Assistant Examiner* — Liam McDowell
(74) *Attorney, Agent, or Firm* — Edmonds & Nolte, PC

(57) ABSTRACT

Embodiments of the disclosure may provide an exemplary method for operating a compressor system, wherein the method may include cooling a process gas containing water vapor to a first temperature. The water vapor may form a condensate at the first temperature, and cooling the process gas may produce residual heat. At least a portion of the condensate is removed from the process gas, wherein any portion of the condensate that is not removed is a remaining condensate. The remaining condensate may be heated to a second temperature with the residual heat, wherein the remaining condensate in the process gas evaporates at the second temperature.

20 Claims, 4 Drawing Sheets

REMOVAL OF MOISTURE FROM PROCESS GAS

BACKGROUND

When high concentrations of an acidic component, such as $CO_2$, $H_2S$, HF, HCl, $H_2SO_4$, or $H_3NO_3$, are present in a gas, the gas is generally referred to as an "acid gas." The acidic component of acid gas will generally cause the pH of liquids contained in the gas, such as water, to fall to between about 3 and 5, for example. In gas compression technology, liquids (e.g., water) with a pH below 4 have been shown to cause Sulfide Stress Cracking (SSC), a form of corrosion, in the metal or alloy components of the gas compression equipment. Typically, corrosion is the most severe during the initial stages of compression, or after an inter-cooler, where the gas temperature is lowered and condensate is formed, but is not completely removed from the gas.

Gases are often cooled before compression and between stages of compression to improve the efficiency of compression, and to keep the gas temperature low enough to be handled with common materials of construction. Process gases are often cooled by water or air-cooled heat exchangers to lower their temperature to near ambient, or at least below about 120° F. If the gas has water vapor in it, the cooling of the gas below the dew point results in the condensation of water from the gas. The dew point is the temperature and pressure at which water vapor condenses from the gas phase to the liquid phase.

Conventional compressor systems may include one or more dehydration systems configured to remove moisture from a process gas before it enters a compressor. A dehydration system may include a glycol system that is capable of removing all free moisture and all but about 10 ppm of water (or less). However, such glycol systems may be expensive, because the component parts must be made of highly expensive alloys that can tolerate corrosive conditions.

More commonly, a conventional compressor system may include an cooling unit configured to cool a process gas to produce condensate, and then pass the cooled gas containing the condensate to a demister configured to remove condensate from the cooled process gas. However, demisters are known to be incapable of removing all condensate from a process gas. The extent to which condensate is removed varies with the design of the heat exchanger and the demister. Thus, an cooling unit/demister configuration may, at best, leave the process gas saturated with water, and depending on the efficiency of the demister, an cooling unit/demister configuration could even leave condensate in the process gas.

Thus, there is a need for a more effective and less expensive system and/or method for reducing corrosion in turbomachines by reducing or eliminating liquid water from process gas.

SUMMARY

In a broad embodiment of the present disclosure, an exemplary method is provided for operating a compressor system. The method may include providing a process gas containing water vapor to a cooling unit. The cooling unit may be configured to cool the water vapor to a temperature below the dew point. Cooling the water vapor to a temperature below the dew point causes water vapor present in the process gas to form a condensate. At least a portion of the condensate is then removed. The process gas, along with any remaining condensate, is then directed to a heat exchanger configured to heat the process gas and any remaining condensate to a temperature above the dew point. Heating the process gas and any remaining condensate to the temperature above the dew point causes any remaining condensate to evaporate, thus creating a dry and non-corrosive gas to be supplied to the compressors.

Exemplary embodiments of the disclosure may further provide an exemplary method for operating a compressor system that may include providing a process gas having water vapor to a moisture removal unit located at the front of the turbomachine upon starting the turbomachine. The moisture removal unit may include a heating unit configured to heat the process gas to a temperature at which the condensate evaporates. The method may also include providing a dry gas to the turbomachine upon shutting down the turbomachine, and providing an increasing amount of heated water to the heating unit as the turbomachine shuts down.

Exemplary embodiments of the disclosure may further provide an exemplary moisture removal unit for a compressor system, which may include a cooling unit and a heating unit. The cooling unit may include a means for cooling a process gas containing water vapor to a first temperature, wherein the water vapor forms a condensate at the first temperature, and the means for cooling the process gas produces residual heat when cooling the process gas. The cooling unit may also include a means for removing at least a portion of the condensate from the process gas, wherein any condensate not removed is a remaining condensate. The heating unit may include a means for using the residual heat to heat the remaining condensate to a second temperature, wherein the remaining condensate in the process gas evaporates at the second temperature.

Exemplary embodiments of the disclosure may further provide an exemplary method for operating a turbomachine, wherein the method may include providing, a process gas having water vapor to a moisture removal unit located at the front of the turbomachine upon starting the turbomachine. The moisture removal unit may include a cooling unit and a heating unit. The cooling unit may include a means for cooling a process gas comprising water vapor to a first temperature, wherein the water vapor forms a condensate at the first temperature. The means for cooling the process gas may produce residual heat when cooling the process gas. The cooling unit may also include means for removing at least a portion of the condensate from the process gas, wherein any condensate not removed is a remaining condensate. The heating unit may be configured to heat the process gas to a temperature at which the remaining condensate evaporates. The method may further include providing a dry gas to the turbomachine upon shutting down the turbomachine, and providing an increasing amount of heated water to the heating unit as the turbomachine shuts down.

Exemplary embodiments of the disclosure may further provide an exemplary method of operating a compressor system. The method may include providing heated water to one or more compressors of the compressor system upon starting the compressor system, providing a dry gas into the compressor system upon shutting down the compressor system, and providing heated water to one or more cooling units of the compressor system upon shutting down the compressor system.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
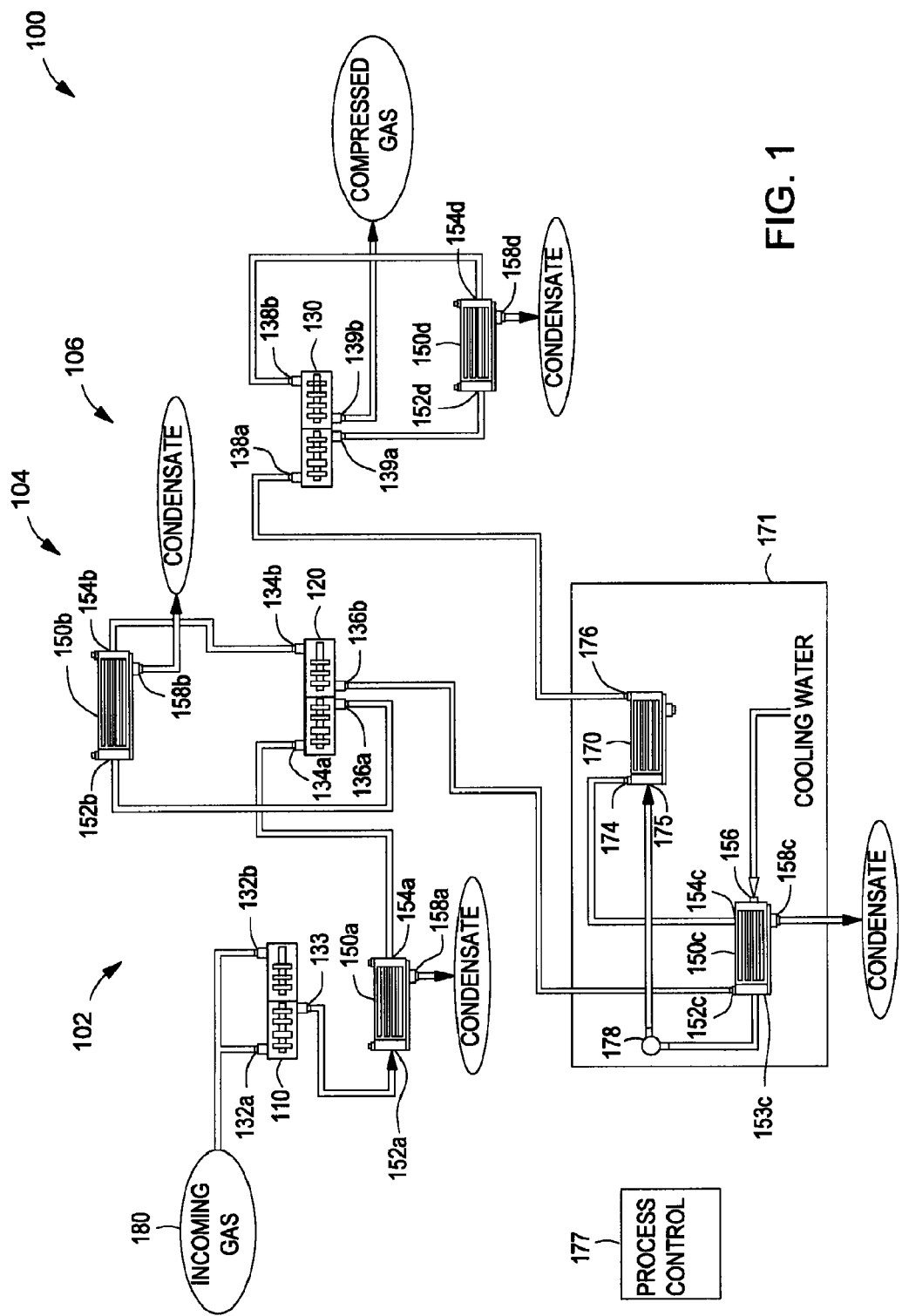
FIG. 1 illustrates a schematic view of an exemplary compressor system according to one or more aspects of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from an exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

FIG. 1 illustrates a turbomachine system 100 according to an exemplary embodiment of the present disclosure. For purposes of this disclosure, a turbomachine may include any rotating machinery configured to act on or with a gas, such as a turbine, compressor, turboset, etc. The turbomachine system 100 may include a plurality of stages 102, 104, and 106, which may include compressors 110, 120, and 130, respectively. In an exemplary embodiment, compressor 110 may be a D16A6 model number compressor manufactured by Dresser-Rand Company, compressor 120 may be a D16R7B model number compressor manufactured by Dresser-Rand Company, and compressor 130 may be a D12R9 model number compressor manufactured by Dresser-Rand Company. In other exemplary embodiments, compressors 110, 120, 130 may be any compressor manufactured by any manufacturer.

Compressor 110 may include two compressor inlets 132a-b and one compressor outlet 133. Further, compressor 120 may include two inlets 134a-b and two outlets 136a-b. Compressor 130 may include two inlets 138a-b, and two outlets 139a-b. Other compressor configurations are also within the scope of the present disclosure.

The turbomachine system 100 may further include one or more cooling units 150a-d. Each of the cooling units 150a-d, may include a heat exchanger (not shown) that is configured to cool a process gas to a temperature and pressure below the dew point, thereby causing formation of condensate. For example, each of the cooling units 150a-d may include water-cooled heat exchangers, such as shell and tube configurations. Each of the cooling units 150a-d may include air-cooled heat exchangers rather than water-cooled heat exchangers. In another exemplary embodiment, the cooling units 150a-d may include refrigeration units in lieu of heat exchangers. The cooling units 150a-d may include any conventional heat exchanger configuration. Each cooling unit 150a-d may include one cooling unit inlet 152a-d and one cooling unit outlet 154a-d, respectively. Further, each cooling unit 150a-d may include a condensate discharge 158a-d, respectively. Each cooling unit 150a-d may also include one or more demisters (not shown) that are configured to remove condensate from the process gas. The cooling units 150a-d may also be configured to collect and subsequently remove condensate using conventional methods of removing condensate from the cooling unit (e.g., a drain, evaporation, etc.).

Cooling unit 150c may also include a cooling water inlet 156 that provides cool water to the cooling unit 150c. Other cooling unit configurations are also within the scope of the present disclosure. For example, each cooling unit 150a-d may be any type of cooling unit that may be configured to cool gas to a temperature and pressure below the dew point, and thereby cause formation of condensate.

The heat exchanger (not shown) of cooling unit 150, may be referred to herein as a "primary heat exchanger." The primary heat exchanger may be configured to cool a process gas to a temperature and pressure below the dew point. Cooling unit 150c and heating unit 170 may form a moisture removal unit 171. Heating unit 170 may include a "secondary heat exchanger" (not shown) that is configured to heat a process gas to a temperature and pressure above the dew point, and thereby cause evaporation of condensate. Heating unit 170 may include an inlet 174, which receives output from outlet 154c of cooling unit 150c. Further, heating unit 170 may include an outlet 176 that is coupled to compressor inlet 138a. Other heating unit configurations are also within the scope of the present disclosure. Furthermore, cooling unit outlet 153c be coupled to heat exchanger inlet 175, and a valve 178 may be coupled between the cooling unit outlet 153c and the heat exchanger inlet 175.

A process control mechanism 177 may be communicably coupled to the moisture removal unit 171. Each of the compressors 110, 120, 130 may be coupled to cooling units 150a-d and heating unit 170. For example, according to an exemplary embodiment, the compressors 110, 120, 130 may be coupled to the cooling units 150a-d and heating unit 170, as shown in FIG. 1 and described herein. Compressor 110 may be coupled to an incoming process gas source 180, which is configured to provide process gas at compressor inlets 132*a-b*. Compressor outlet 133 may be coupled to cooling unit inlet 152*a*. Cooling unit outlet 154*a* may be coupled to compressor inlet 134*a*. Each of the condensate discharges 158*a-d* may optionally be coupled to a condensate recycling system (not shown). The condensate recycling system may direct all removed condensate to a single location.

Compressor outlet 136*a* may be coupled to cooling unit inlet 152*b*, and cooling unit outlet 154*b* may be coupled to compressor inlet 134*b*. Further, compressor outlet 136*b* may be coupled to cooling unit inlet 152*c*. Cooling unit outlet 154*c* may be coupled to heating unit inlet 174, and heating unit outlet 176 may be coupled to compressor inlet 138*a*.

Compressor outlet 139*a* may be coupled to cooling unit inlet 152*d*, and cooling unit outlet 154*d* may be coupled to compressor inlet 138*b*. Finally, compressor outlet 139*b* may be coupled to another turbomachine system 100 component, such as a cooling unit or a compressor, in an additional compressor stage that is not shown in FIG. 1. In an exemplary embodiment, the compressor 130 may be the final stage of a multi-stage compressor system. Other coupling configurations among the compressors 110, 120 and 130, the cooling units 150*a-d*, and the heating unit 170 are also possible according to other exemplary embodiments of the present disclosure.

Operation of the turbomachine system 100, according to an exemplary embodiment, may begin at stage 102, wherein incoming process gas may be provided to the compressor inlets 132*a-b*. The compressor 110 may compress the process gas, and may direct the process gas from compressor outlet 133 to cooling unit inlet 152*a*. The cooling unit 150*a* may lower the temperature and pressure of the process gas below the dew point to produce condensate, and remove the resulting condensate from the process gas. Various conventional methods may be used to remove condensate from the process gas (e.g., demisters). The removed condensate may collect at condensate discharge 158*a*. At the condensate discharge 158*a*, the condensate may be evaporated, or directed to a recycling system (not shown). The process gas may then proceed to stage 104 by flowing from cooling unit outlet 154*a* to inlet 134*a* of compressor 120.

According to an exemplary embodiment, in stage 104, the compressor 120 may further compress the process gas received from the cooling unit 150*a*. The process gas may then exit compressor outlet 136*a* and flow to cooling unit inlet 152*b*. Cooling unit 150*b* may once again lower the temperature and pressure of the process gas below the dew point to form condensate and remove the condensate from the process gas. The cooling unit 150*b* may use various conventional methods of removing condensate from the process gas (e.g., demisters). The removed condensate may collect at condensate discharge 158*b*. At the condensate discharge 158*b*, the condensate may be evaporated, or directed to a recycling system (not shown). The process gas may then flow from cooling unit outlet 154*b* to compressor inlet 134*b*, where the process gas may be compressed even further.

The moisture removal unit 171 may further dehydrate the process gas. The process gas may flow from compressor outlet 136*b* to cooling unit inlet 152*c*. Cooling unit 150*c* may cool the process gas to a temperature and pressure below the dew point. As a result of the cooling, water vapor in the process gas becomes condensate. The cooling unit 150*c* may use various conventional methods of removing condensate from the process gas (e.g., demisters).

In an exemplary embodiment, cooling the process gas may produce residual heat. The residual heat may be transferred to the cooling water, thereby producing heated water. The heated water may be directed to the inlet 175 of heating unit 170. In an exemplary embodiment, a portion of the removed condensate may collect at condensate discharge 158*c*. At the condensate discharge 158*c*, a portion of the condensate may be evaporated, or directed to a recycling system (not shown).

The process gas may flow from cooling unit outlet 154*c* to heat exchanger inlet 174. The secondary heat exchanger of the heating unit 170 may be configured to vaporize any condensation remaining in the process gas by heating the process gas and any remaining condensate to a temperature and pressure above the dew point.

According to an exemplary embodiment, the heating unit 170 may use the heated water to heat the process gas. For example, the temperature of the process gas entering the cooling unit 150*c* at cooling unit inlet 152*c* may be about 300° F., and the temperature of the cooling water entering the cooling unit 150*c* at cooling unit inlet 156 may range from ambient temperature to about 110° F. If the process gas and the cooling water flow in the cooling unit 150*c* according to a counter flow setup, the exiting water temperature will have a temperature that is intermediate between the incoming water temperature and the incoming gas temperature.

If the heat exchanger of the cooling unit 150*c* (not shown) is properly designed to the heat load, the exiting water temperature will approach the incoming gas temperature. For almost all gases, the exiting water will likely contain adequate heat content to evaporate the remaining condensate. Even with co-current flow, there will likely be enough heat in the exiting water to evaporate the remaining condensate. However, the heat transfer area of the heating unit 170 will need to be larger than with the co-current flow scenario than the counter-current flow scenario.

In order to minimize the loss of compression efficiency that may result from (1) the pressure loss in going through a second heat exchanger, and (2) the temperature rise of the process gas in the heating unit 170, the heating unit 170 may be configured to minimize the pressure drop, and may use a controlled heat input to achieve the target temperature increase.

Alternatively, to compensate for the loss of compression efficiency that may result from heating the process gas above the dew point, the process gas can be cooled to a temperature that is several degrees lower than the dew point temperature before moving the gas to the next compressor, and then heating the process gas to above the dew point.

In an exemplary embodiment, the heating unit 170 may use means other than heated water to heat the process gas, including without limitation rod or wire heaters, electricity, gaseous fuel, or fuel oil. As may be appreciated, each means for heating the process gas may be used alone or in combination. The other means for heating the process gas may be controlled by either the heating unit 170 or a process control mechanism as described above.

If the quantity of water to be removed and the composition and quantity of gases involved are known, then it may be possible to calculate the amount of energy required to heat the process gas to a temperature and pressure above the dew point. In an exemplary embodiment, if such variables are unknown, it may be possible to determine their values, because heat capacities of most commercial gas mixtures are well known, or may be estimated. Furthermore, it may be possible to calculate the amount of heat necessary to heat the process gas and any condensate present in the composition to a temperature and pressure above the dew point, even if the only known variables are the water content of the incoming gas and the quantity of water that was condensed and removed. Such variables may be determined via conventional sensors located at various places in the turbomachine system 100.

In an exemplary embodiment, the process control mechanism 177 may be communicably coupled to a sensor (not shown) that is configured to detect the quantity of water still present in the process gas. The process control mechanism 177 may estimate the amount of energy required to vaporize water remaining in the process gas based on input from a sensor (not shown), and may control valve 178, so as to regulate the amount of heated water entering the heating unit 170. For example, the process control mechanism may control the valve 178, and thereby control the amount of heated water entering the heating unit 170, based on readings of temperature and water content of the gas exiting the heating unit 170.

A "Sereda" humidity sensor, or other similar sensor, can be used to determine if the gas leaving the heating unit 170 contains condensate. The process control mechanism 177 may then adjust components of the turbomachine system 100 based upon data provided by the sensor. For example, depending on the data provided by the sensor, the process control mechanism 177 may lower the temperature of the cooling unit 150$c$, raise the temperature of the heating unit 170, and/or increase the efficiency of a demister unit. Furthermore, the process control mechanism 177 may control the flow rate of heating and cooling water based upon feedback loops that are communicably coupled to temperature sensors.

In an exemplary embodiment, the secondary heat exchanger of the heating unit 170 may heat the process gas to a temperature that is about 5° F. to about 10° F. higher than the temperature of the process gas entering the heating unit 170. For example, the temperature of the process gas entering the heating unit 170 may be about 115° F. and the temperature of the process gas after heating may be about 120° F.

A moisture removal unit similar to the moisture removal unit 171 may also be used at other locations of the turbomachine system 100. In some embodiments, implementation of multiple heating units 170 in a back-to-back configuration may be necessary to prevent corrosive conditions in locations of the turbomachine system 100 that may be more prone to corrosion, for example, at the initial stages of a compressor train. The corrosion is typically more severe during the initial stages of compression, because liquid water is most likely to be present in the process gas during the initial stages. Corrosion can also be problematic in later stages of compression for very wet gases, or when condensate is formed from process upsets, shut downs and startups that allow cooling of a gas below its dew point in a given stage of compression.

In an exemplary embodiment, the heating unit 170 may include a first heating unit and a second heating unit, wherein the second heating unit receives process gas from the first heating unit, and heats the process gas and any remaining condensate to a temperature and pressure that is above the dew point. As an added benefit, utilizing a heating unit 170 may be less expensive and safer than using more corrosion-resistant materials in a turbomachine system 100.

The heating unit 170 may be built from the same material as the primary heat exchanger of cooling unit 150$c$. As a result of the relatively small size and simplicity of the heating unit 170 as compared to the heat exchanger present in cooling units 150$a$-$d$, the heating unit 170 may be relatively inexpensive to implement and maintain. Care should be taken to not oversize the heat exchanger of the cooling unit 150$c$ with respect to the heating unit 170. Also, the amount of cooling water provided to the cooling unit 150 at inlet 156 should be monitored so that the temperature of the heated water provided at outlet 153$c$ has enough heat content.

Still referring to FIG. 1, the process gas may flow from heat exchanger outlet 176 to compressor inlet 138$a$. Compressor 130 may compress the process gas, and direct the process gas from compressor outlet 139$a$ to cooling unit inlet 152$d$. Cooling unit 150$d$ may cool the process gas and remove condensate using the methods described above with respect to cooling units 150$a$-$c$. The cooling unit 150$d$ may direct the process gas from cooling unit outlet 154$d$ to compressor inlet 138$b$. Compressor 130 may recompress the process gas, and may either direct the process gas to another component of the turbomachine system 100, or may provide the process gas to another system for further processing.

Figure 2:
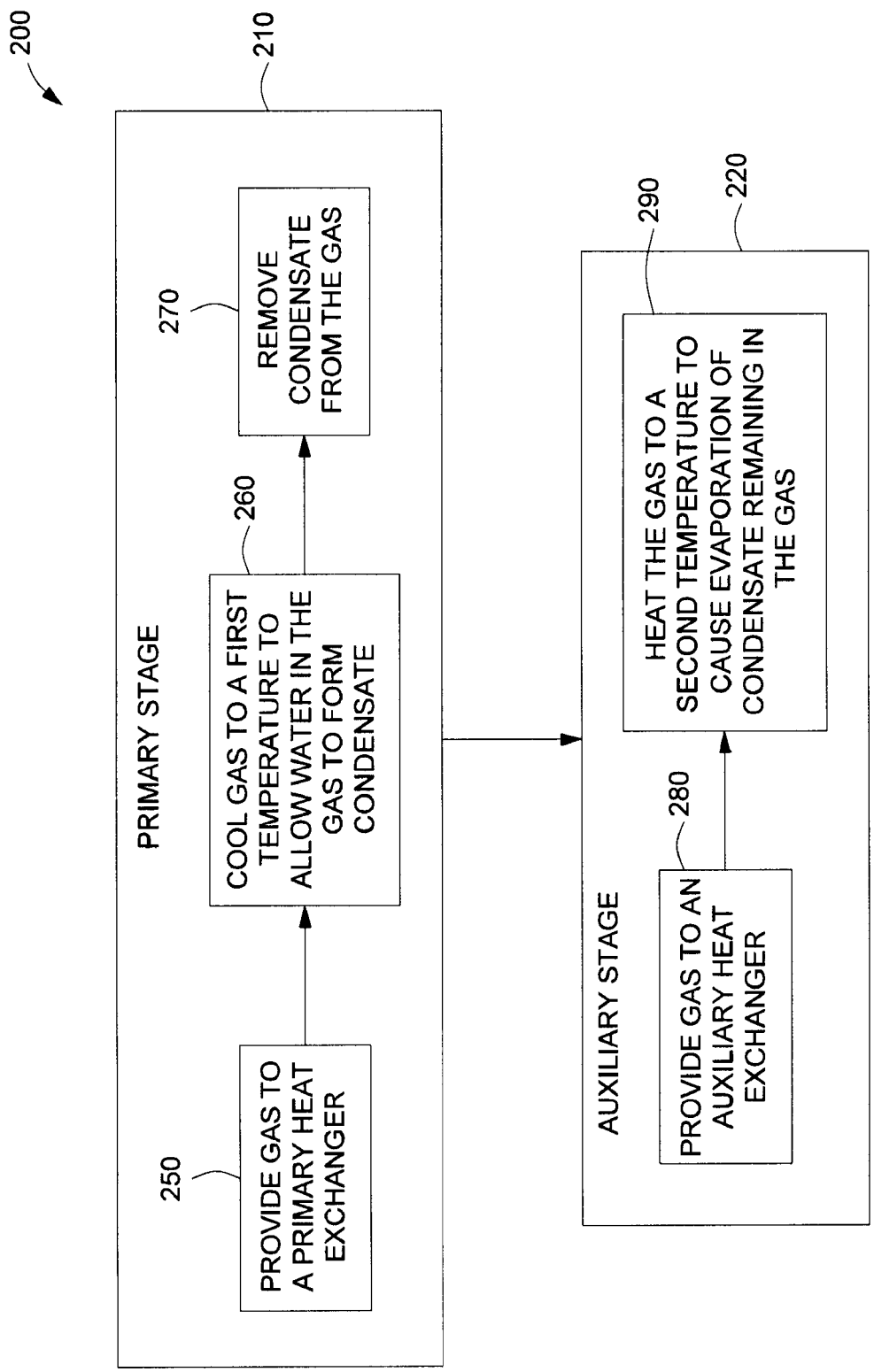
FIG. 2 illustrates a flow chart of an exemplary method for reducing corrosion in compressors according to one or more aspects of the present disclosure.

FIG. 2 shows an exemplary method 200 of removing water from a process gas according to an exemplary embodiment. The method 200 may include a primary stage 210 and a secondary stage 220. The primary stage 210 may include a step 250, at which process gas may flow to a primary heat exchanger, such as the heat exchanger present in the cooling unit 150$c$ (not shown) described above with respect to FIG. 1. The primary heat exchanger may lower the temperature of the process gas to a first temperature that causes water vapor in the process gas to form water condensate, as at step 260. The first temperature is below the dew point temperature. The heat exchanger may be any heat exchanger known in the art, including without limitation an air-cooled heat exchanger and a water-cooled heat exchanger. In another exemplary embodiment, instead of using a heat exchanger, the process gas may be cooled using a refrigeration unit.

Further, the primary stage 210 may also include a step 270, wherein water condensate may be removed from the process gas. In an exemplary embodiment, removal of the water condensate may be performed by one or more demisters using conventional methods. The process of cooling the process gas at step 260 may produce residual heat, which may in turn heat the cooling water to form heated water. This heated water may be used in a later step of method 200, as described below.

The method 200 may continue to the secondary stage 220. The secondary stage 220 may include a step 280, wherein the process gas may flow to a heating unit, such as the heating unit 170 described above with respect to FIG. 1. In an alternate embodiment, the process gas may be cooled further prior to step 280. At the secondary stage 220, a secondary heat exchanger of the heating unit may be configured to heat the process gas to a temperature and pressure above the dew point, thereby causing a portion of any remaining condensate that is present in the process gas to evaporate. This may further reduce the amount of remaining water condensate within the process gas, and may reduce the potential of corrosion in a turbomachine.

The amount of heat required to evaporate any condensate remaining in the process gas may depend on the efficiency of the primary heat exchanger and the associated demisters used to remove the condensate in the primary stage 210. Further, the heat required to evaporate the remaining condensate may be partially or wholly provided by the heated water produced by the primary heat exchanger at step 260. In an exemplary embodiment, rod or wire heaters, electricity, gaseous fuel, or fuel oil may be used to heat the process gas leaving the heating unit. All of the foregoing are means for heating the process gas leaving the heating unit.

In an exemplary embodiment of the method 200, in the secondary stage 220, the process gas may be heated to a temperature that is about 5° F. to about 10° F. higher than the temperature of the process gas entering the secondary stage 220. For example, the temperature of the process gas entering the secondary stage 220 may be about 115° F. and the temperature of the process gas after heating may be about 120° F. or higher.

Conditions that may be conducive to corrosion may also be present during startup and/or shutdown of a turbomachine system. For example, when a turbomachine system is shut down, as the pressure falls throughout the turbomachine system, the temperature in the turbomachine system may also fall. Each of the various turbomachine system components may progressively reach the dew point as the system shuts down, resulting in the formation of condensation from any water vapor that is present in the process gas. If precautions are not taken to dry the turbomachine system components after condensation occurs, the moisture may result cause corrosion, such as Sulfide Stress Cracking or general corrosion.

Figure 3:
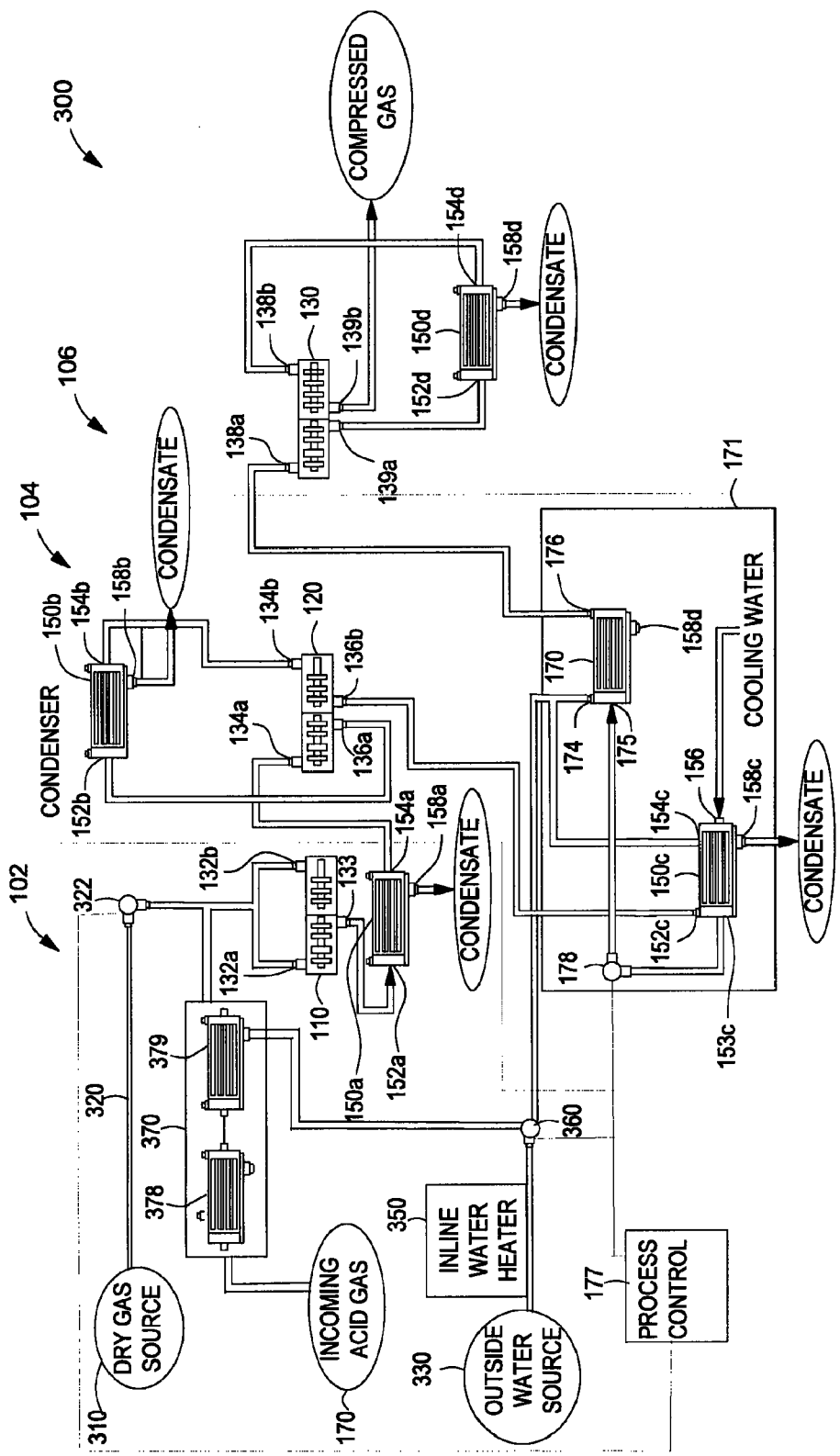
FIG. 3 illustrates a schematic view of an exemplary compressor according to one or more aspects of the present disclosure.

FIG. 3 shows a turbomachine system 300 according to another exemplary embodiment of the present disclosure. The turbomachine system 300 may be similar to the turbomachine system 100, as described above. Reference numbers that are used in FIG. 1 are also used in FIG. 3 to identify identical components.

Turbomachine system 300 may further include a dry gas source 310 and a dry gas transport 320. In an exemplary embodiment, the dry gas transport 320 may include a pipe that fluidicly couples the dry gas source 310 to compressor inlets 132a-b, and may also include a valve 322 that is coupled to the dry gas transport 320.

The turbomachine system 300 may also include an outside water source 330 and an outside water transport 340 that couples the outside water source 330 to the inline water heater 350. The inline water heater 350 may be coupled to the heating unit 170. A valve 360 may be coupled between the inline water heater 350 and the heating unit 170.

The process control mechanism 177 may be communicably coupled to the valves 178, 322, 360. The turbomachine system 300 may also include a moisture removal unit 370 located at the front of the compressor train between the process gas source 170 and the compressor 110. The moisture removal unit 370 may be similar to heating unit 170 of the moisture removal unit 171 described above with respect to FIG. 1. In an exemplary embodiment, the moisture removal unit 370 may include a cooling unit 378 and a heating unit 379. The heating unit 379 may be coupled to the valve 360. The valve 360 may also be coupled to the inline water heater 350 and the heating units 170.

An exemplary operation of the turbomachine system 300 may include providing a process gas to the cooling unit 378 of moisture removal unit 370. The operation of the cooling unit 378 and the heating unit 379 may be similar to the operation of the cooling unit 150c and the heating unit 170, respectively, as described above with respect to FIG. 1. Placing the moisture removal unit 370 at the head of the turbomachine system 300 facilitates maintaining operating temperatures and pressures in the compressor train above the dew point during startup of the turbomachine system 300. The turbomachine system 300 may then operate as described above with respect to FIGS. 1 and 2.

During the shutdown of turbomachine system 300, the turbomachine system 300 may provide a dry gas from the dry gas source 310 to the compressor inlets 132a-b. The valve 322 may gradually increase the quantity of dry gas provided to the compressor inlets 132a-b as the quantity of process gas in the turbomachine system 300 decreases. A process control mechanism 178 may be configured to control the valve 322 based upon environmental conditions of the turbomachine 300. For example, the process control mechanism 177 may be communicably coupled to sensors configured to detect the quantity of process gas in the turbomachine system 300.

As discussed above, residual heat generated by the cooling unit 150c during cooling of the process gas may be used to heat removed condensate, and thereby create heated water. During shutdown, the turbomachine system 300 may increase the amount of heated water that is provided from the cooling unit 150c to the heating unit 170. As compressors 110, 120, 130 are shut off, beginning at the back of the compression train and moving towards the front of the compression train, valve 178 may control the quantity of heated water provided to the heating unit 170. Valve 178 may increase the quantity of heated water directed to the heating unit 170 in order to keep the temperature and pressure of downstream component environments above the dew point. The process control mechanism 177 may be configured to control valve 178 based upon environmental conditions in the turbomachine 300. For example, the valve 178 may control the amount of heated water entering the heating unit 170 based on readings of temperature and water content of the gas exiting the heating unit 170.

In addition to increasing the amount of heated water that is provided from the cooling unit 150c to the heating unit 170, additional heated water may be provided from other sources. For example, the outside water source 330 may provide water to the inline water heater 350, and the inline water heater 350 may heat the water, and provide the heated water to the heating units 360, 379. The valve 360 may control the provision of the heated water from the inline water heater 350 to the heating units 360, 379.

In another exemplary embodiment, process control mechanism 178 may be configured to control the valve 360 based upon environmental conditions in the turbomachine 300. A person of ordinary skill in the art may utilize modeling tools to design a process control mechanism that efficiently coordinates the injection of gas and provision of heated water to components of the turbomachine system 300 upon shutdown.

Figure 4:
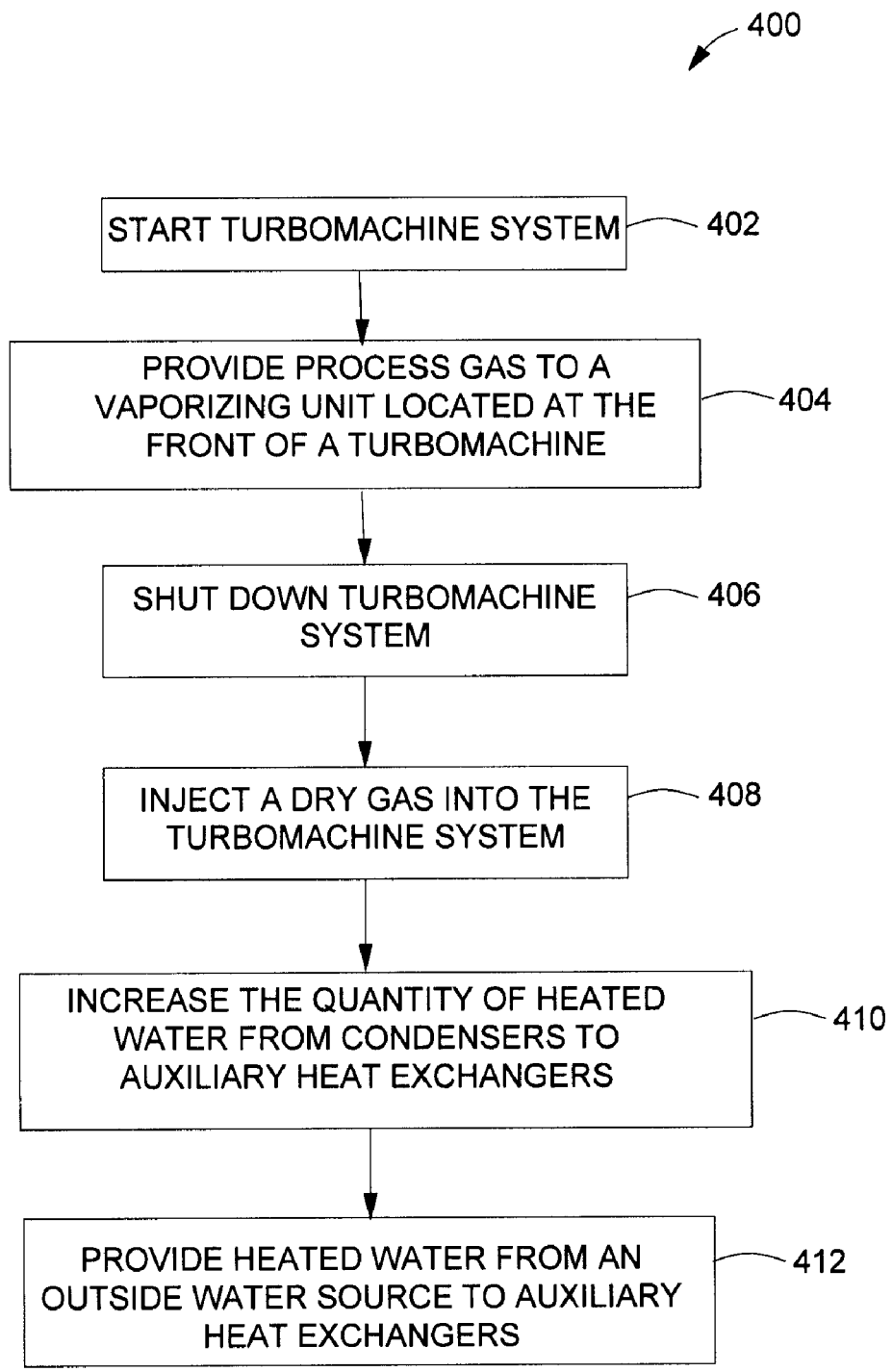
FIG. 4 illustrates a flow chart of an exemplary method for reducing corrosion in compressors according to one or more aspects of the present disclosure.

FIG. 4 shows an exemplary embodiment of a method 400 for reducing corrosion resulting from the startup and shutdown stages of a turbomachine system. The method 400 may include starting the turbomachine system at step 402. At step 404, a process gas may be provided to a moisture removal unit that is placed at the front of the turbomachine system, such as moisture removal unit 370 shown in FIG. 3. After continued operation, the turbomachine system may be shut down at a step 406. When the turbomachine system is shut down, a dry gas, such as nitrogen or sweet gas, may be injected into the turbomachine system at step 408 to replace the decreasing amount of process gas that is entering the turbomachine system 300. The turbomachine system may also increase the amount of heated water provided from cooling units to heating units at step 410. At a step 412, heated water from an outside water source may be provided to the heating units as the amount of heated water generated by the cooling units decreases. The heated water from the outside water source compensates for the reduced amount of heated water that is provided by the cooling units to the heating units during the shut down of the turbomachine system.

In a case study of a turbomachine system similar to the turbomachine system 100 shown in FIG. 2, the gas coming into a D12R9 compressor manufactured by Dresser-Rand Company, at stage 8, was 355 psig, 120° F., and wet. The calculated partial pressure of hydrogen sulfide was 20 bar, which is greater than that currently allowed by NACE for 17-4 PH stainless steel. However, if the gas were dry, and could be guaranteed to always be dry, 17-4 PH stainless steel could be used to manufacture the compressor.

In this study, there was a cooling unit before stage 8, which dropped the temperature of the gas from 297° F. to 120° F. while the pressure dropped from 361 to 355 psig. Assuming 90% of the moisture was removed via this cooling unit, the gas entering the D12R9 compressor was still wet. The use of a heating unit could ensure that the gas entering the compressor is dry.

Assuming the cooling unit is a water-cooled heat exchanger, such as a tube and shell heat exchanger, then a secondary tube and shell heat exchanger can be added to raise the gas temperature before entering the D12R9 compressor. Assuming the cooling unit has the gas and cooling water flowing in a counter-current manner, then the water exiting the heat exchanger of the cooling unit could be well over 200° F., and more likely in excess of 250° F. Some of this water could be fed into the heating unit to raise the temperature of the gas.

Assuming the temperature of the gas is raised from 120° F. to 130° F. in the heating unit, and that there is an additional pressure drop across the heating unit equal to what occurred in the heat exchanger of the cooling unit, then the gas entering the D12R9 compressor will be 130° F. and 350 psig. Under these conditions, the gas will be dry. It is estimated that the pressure drop across the heating unit could cause about a one half percent drop in compressor efficiency. This compressor efficiency decrease may be lessened by cooling the process gas even further below the dew point prior to heating the process gas.

The exemplary embodiments of methods and systems of the present disclosure may be inexpensive to manufacture and operate in comparison to other dehydration systems. One reason for this is that exemplary embodiments of the present disclosure may include relatively simpler component parts as compared to those used in other dehydration systems. Further, the exemplary embodiment of the present disclosure may ease integration into existing systems, because the primary heat exchanger may already exist in the compressor system to cool the process gas. Thus, only the heating unit may need to be added to the system. Nonetheless, it should be understood that the exemplary embodiments of the present disclosure may also be used in conjunction with other dehydration systems to reduce corrosion in compressor systems.

Although the present disclosure has described embodiments relating to specific compressors, it is understood that the apparatus, systems and methods described herein could applied to other turbomachine environments.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A method for operating a compressor system, comprising:
    cooling a process gas containing water vapor to a first temperature, wherein the water vapor forms a condensate at the first temperature, and wherein cooling the process gas produces residual heat;
    removing at least a portion of the condensate from the process gas, wherein any portion of the condensate that is not removed is a remaining condensate; and
    heating the remaining condensate to a second temperature with the residual heat, wherein the remaining condensate in the process gas evaporates at the second temperature.

2. The method of claim 1, wherein the first temperature is about 5° F. to about 10° F. less than the second temperature.

3. The method of claim 1, wherein the first temperature is about 115° F. and the second temperature is about 120° F.

4. The method of claim 1, further comprising calculating the amount of energy necessary to heat the remaining condensate to the second temperature, and using approximately the calculated amount of energy to heat the remaining condensate to the second temperature.

5. A moisture removal unit for a compressor system, comprising:
    a cooling unit comprising:
        a means for cooling a process gas containing water vapor to a first temperature, wherein the water vapor forms a condensate at the first temperature, and the means for cooling the process gas produces residual heat when cooling the process gas; and
        a means for removing at least a portion of the condensate from the process gas, wherein any condensate not removed is a remaining condensate; and
    a heating unit comprising a means for using the residual heat to heat the remaining condensate to a second temperature, wherein the remaining condensate in the process gas evaporates at the second temperature.

6. The moisture removal unit of claim 5, wherein the first temperature is about 5° F. to about 10° F. less than the second temperature.

7. The moisture removal unit of claim 5, wherein the first temperature is about 115° F. and the second temperature is about 120° F.

8. The moisture removal unit of claim 5, wherein the second cooling unit further comprises a processor configured to calculate the amount of energy necessary to heat the remaining condensate to the second temperature, and the means for heating the process gas to the second temperature is configured to use approximately the calculated amount of energy to heat the remaining condensate to the second temperature.

9. A compressor system, comprising:
    a compressor coupled to a moisture removal unit, wherein the moisture removal unit comprises:
        a cooling unit that includes:
            a means for cooling a process gas comprising water vapor to a first temperature, wherein the water vapor forms a condensate at the first temperature, and wherein the means for cooling the process gas produces residual heat when cooling the process gas, and
            a means for removing at least a portion of the condensate from the process gas, wherein any condensate not removed is a remaining condensate; and
        a heating unit that includes a means for heating the remaining condensate to a second temperature using the residual heat, wherein the remaining condensate evaporates at the second temperature.

10. The system of claim 9, wherein the first temperature is about 5° F. to about 10° F. less than the second temperature.

11. The system of claim 9, wherein the first temperature is about 115° F. and the second temperature is about 120° F.

12. The system of claim 9, wherein the second cooling unit further comprises a processor configured to calculate the amount of energy necessary to heat the remaining condensate to the second temperature, and the means for heating the process gas to the second temperature is configured to use approximately the calculated amount of energy to heat the remaining condensate to the second temperature.

13. A method of operating a turbomachine, comprising:
providing, a process gas having water vapor to a moisture removal unit located at the front of the turbomachine upon starting the turbomachine, wherein the moisture removal unit includes:
  a cooling unit that includes:
    a means for cooling a process gas comprising water vapor to a first temperature, wherein the water vapor forms a condensate at the first temperature, and wherein the means for cooling the process gas produces residual heat when cooling the process gas, and
    a means for removing at least a portion of the condensate from the process gas, wherein any condensate not removed is a remaining condensate; and
  a heating unit, wherein the heating unit is configured to heat the process gas to a temperature at which the remaining condensate evaporates;
providing a dry gas to the turbomachine upon shutting down the turbomachine; and
providing an increasing amount of heated water to the heating unit as the turbomachine shuts down.

14. The method of claim 13, wherein providing an increasing amount of heated water to the heating unit as the turbomachine shuts down comprises:
  heating outside water provided by an outside water source to create heated outside water; and
  providing the heated outside water to the heating unit.

15. The method of claim 13, wherein the heating unit includes a first heating unit and a second heating unit placed in a back-to-back configuration.

16. The method of claim 13, wherein the first temperature is about 5° F. to about 10° F. less than the second temperature.

17. The method of claim 13, wherein the first temperature is about 115° F. and the second temperature is about 120° F.

18. The method of claim 13, wherein at least one of rod or wire heaters, electricity, gaseous fuel, or fuel oil are used to heat the process gas to the second temperature.

19. The method of claim 13, calculating the amount of energy necessary to heat the process gas to the second temperature, and the means for heating the process gas to the second temperature is configured to use approximately the calculated amount of energy to heat the process gas to the second temperature.

20. The method of claim 13, further comprising increasing the dry gas provided to the turbomachine as the process gas in the turbomachine decreases.

* * * * *